(12) United States Patent
Zhang et al.

(10) Patent No.: US 7,463,699 B2
(45) Date of Patent: Dec. 9, 2008

(54) METHODS OF AUTOMATICALLY DETECTING SPECTRUM INVERSION AND RELATED TERRESTRIAL DIGITAL VIDEO BROADCASTING RECEIVERS

(75) Inventors: Jun-Ling Zhang, Gyeonggi-do (KR); Sato Masaki, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 619 days.

(21) Appl. No.: 11/269,309

(22) Filed: Nov. 8, 2005

(65) Prior Publication Data
US 2006/0098751 A1    May 11, 2006

(30) Foreign Application Priority Data
Nov. 11, 2004    (KR) .................... 10-2004-0091885

(51) Int. Cl.
*H03K 9/00* (2006.01)
*H04B 1/707* (2006.01)
(52) U.S. Cl. ..................... 375/316; 375/150
(58) Field of Classification Search ................. 375/316, 375/150, 343
See application file for complete search history.

(56) References Cited
U.S. PATENT DOCUMENTS
6,046,775 A    4/2000    Jonnalagadda et al.

| | | | |
|---|---|---|---|
| 6,252,898 B1 | 6/2001 | Eto et al. | |
| 7,170,945 B2 * | 1/2007 | Blat | 375/260 |
| 2003/0023978 A1 * | 1/2003 | Bajgrowicz | 725/68 |
| 2004/0260985 A1 * | 12/2004 | Krieger | 714/707 |
| 2005/0100118 A1 | 5/2005 | Zhang | |

FOREIGN PATENT DOCUMENTS
JP    2000295194    10/2000
KR    1020020022915    3/2002

OTHER PUBLICATIONS

Combined Search and Examination Report under Sections 17 & 18 (3) from the British Patent Office dated Mar. 9, 2006.

* cited by examiner

*Primary Examiner*—Kevin Y Kim
(74) *Attorney, Agent, or Firm*—Myers Bigel Sibley & Sajovec

(57) ABSTRACT

DVB-T receivers and methods may provide automatic detection of spectrum inversion using continual pilot correlation. A DVB-T receiver may include a demodulator, a fast Fourier transformation (FFT) unit, and a spectrum inversion detector. The demodulator may demodulate a received DVB-T digital signal according to a spectrum inversion signal, and the FFT unit may perform fast Fourier transformation (FFT) on the demodulated signal. The spectrum inversion detector may calculate continual pilot correlation values for the FFT-processed signal and may generate the spectrum inversion signal to indicate whether spectrum inversion has occurred according to the calculated correlation values. The DVB-T receiver may perform normal correlation and position inversion correlation on continual pilots using a spectrum inversion detector to automatically detect whether spectrum inversion has occurred. Related methods are also discussed.

20 Claims, 5 Drawing Sheets

METHODS OF AUTOMATICALLY DETECTING SPECTRUM INVERSION AND RELATED TERRESTRIAL DIGITAL VIDEO BROADCASTING RECEIVERS

RELATED APPLICATION

This application claims the benefit of priority from Korean Patent Application No. 2004-0091885, filed on Nov. 11, 2004, in the Korean Intellectual Property Office, the disclosure of which is incorporated herein in its entirety by reference.

FIELD OF THE INVENTION

The present invention relates to terrestrial digital video broadcasting (DVB-T), and more particularly, to DVB-T receivers and methods.

BACKGROUND

A DVB-T signal may use multiple carriers based on orthogonal frequency division multiplexing (OFDM). A data frame of a DVB-T signal may include 68 OFDM symbols, each including 1705 active carriers when in a 2K mode or 6817 active carriers when in an 8K mode. Each symbol includes pilot carriers used for synchronization, mode detection, and channel estimation, and locations of the pilot carriers may be predetermined.

FIG. 1 is a block diagram of a conventional DVB-T receiver 100. Referring to FIG. 1, conventional DVB-T receiver 100 includes a radio frequency (RF) module 110, a demodulator 120, a fast Fourier transform (FFT) unit 120, a symbol timing recovery and carrier recovery (STR & CR) unit 140, an equalizer 150, and a decoder 160 for forward error correction. An output of the decoder 160 is provided to a signal processing unit to generate signals for display and audio output. The demodulator 120 removes a symbol timing offset and a carrier frequency offset (detected by the STR&CR unit 140) from a DVB-T digital signal generated by the RF module 110 and demodulates the DVB-T digital signal.

The demodulator 120 receives a manually set spectrum inversion signal Spectrum_Inversion and operates in a spectrum inversion mode or a non-spectrum inversion mode according to a logical state of the spectrum inversion signal Spectrum_Inversion. That is, the spectrum inversion signal Spectrum_Inversion indicates whether (or not) the DVB-T digital signal received from the RF module 110 is a spectrum-inverted signal. The demodulator 120 demodulates the DVB-T digital signal using oscillation signals generated for the manually set spectrum inversion signal Spectrum_Inversion. Here, an inconvenience may result because a user may need to determine whether a spectrum of the DVB-T digital signal is inverted and set the spectrum inversion signal Spectrum_Inversion according to the determination.

SUMMARY

Embodiments of the present invention may provide DVB-T receivers that automatically detect spectrum inversion. Embodiments of the present invention may also provide DVB-T receiving methods of automatically detecting spectrum inversion.

According to some embodiments of the present invention, a DVB-T receiver may include a demodulator, an fast Fourier transformation (FFT) unit, a spectrum inversion detector, an equalizer, and a decoder. The demodulator may demodulate a received DVB-T digital signal according to a spectrum inversion signal. The FFT unit may perform fast Fourier transformation (FFT) on the demodulated signal. The spectrum inversion detector may calculate continual pilot correlation values for the FFT-processed signal and may generate the spectrum inversion signal to indicate whether spectrum inversion has occurred according to the calculated correlation values. The equalizer may compensate for distortion of the FFT-processed signal and may generate the distortion-compensated signal as an equalized signal. The decoder may decode the equalized signal from the equalizer and may generate the decoded signal.

The demodulator may demodulate the received DVB-T digital signal using a cosine oscillation signal and a sine oscillation signal, and may demodulate the received DVB-T digital signal by selectively applying the sine oscillation signal to the received DVB-T digital signal as a positive value or a negative value according to a logical state of the spectrum inversion signal.

The fast Fourier transformation (FFT) unit may perform fast Fourier transformation (FFT) on the demodulated signal using symbol timing offset information calculated from the demodulated signal and the FFT-processed signal.

The demodulator may demodulate the received DVB-T digital signal using a cosine oscillation signal and a sine oscillation signal determined from the carrier frequency offset information calculated from the demodulated signal and the FFT-processed signal and using symbol timing offset information calculated from the FFT-processed signal.

The spectrum inversion detector may include a pseudo random binary sequence (PRBS) generator, a normal correlation unit, a first peak value detector, a position inversion correlation unit, a second peak value detector, and a decision unit. The pseudo random binary sequence (PRBS) generator may generate a PRBS signal, and the normal correlation unit may generate first correlation values by performing a continual pilot correlation for the FFT-processed signal using the PRBS signal. The first peak value detector may detect a maximum of the first correlation values of one symbol and may provide the detected maximum value as a first peak value. The position inversion correlation unit may receive a signal obtained by inverting a position of the FFT-processed signal and may provide second correlation values by performing a continual pilot correlation for the position inverted signal using the PRBS signal. The second peak value detector may detect a maximum of the second correlation values of one symbol and may provide the detected maximum value as a second peak value. The decision unit may compare the second peak value with the first peak value and may generate the spectrum inversion signal according to the comparison result.

According to other embodiments of the present invention, a DVB-T receiving method may include demodulating a received DVB-T digital signal according to a spectrum inversion signal, and FFT may be performed on the demodulated signal. Continual pilot correlation values may be calculated for the FFT-processed signal, and the spectrum inversion signal may be generated to indicate whether spectrum inversion has occurred according to the calculated correlation values.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will also be understood that when an element is referred to as being connected and/or coupled to/with another element, it can be directly connected and/or coupled to/with the other element or intervening elements may also be present. In contrast, if an element is referred to as being directly connected and/or coupled to/with another element, then no other intervening elements are present. As used herein, the term and/or includes any and all combinations of one or more of the associated listed items.

It will be understood that although the terms first and second are used herein to describe various elements, these elements should not be limited by these terms. These terms are only used to distinguish one element from another element. Thus, a first element discussed below could be termed a second element, and similarly, a second element could be termed a first element without departing from the teachings of the present invention. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
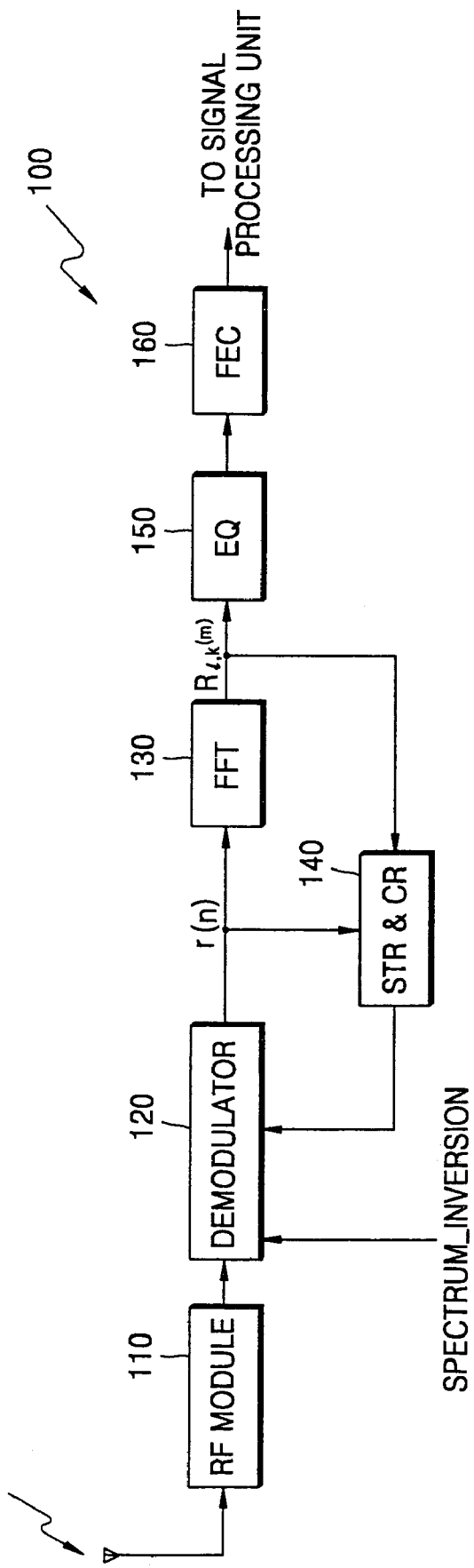
FIG. 1 is a block diagram of a conventional DVB-T receiver.
Figure 2:
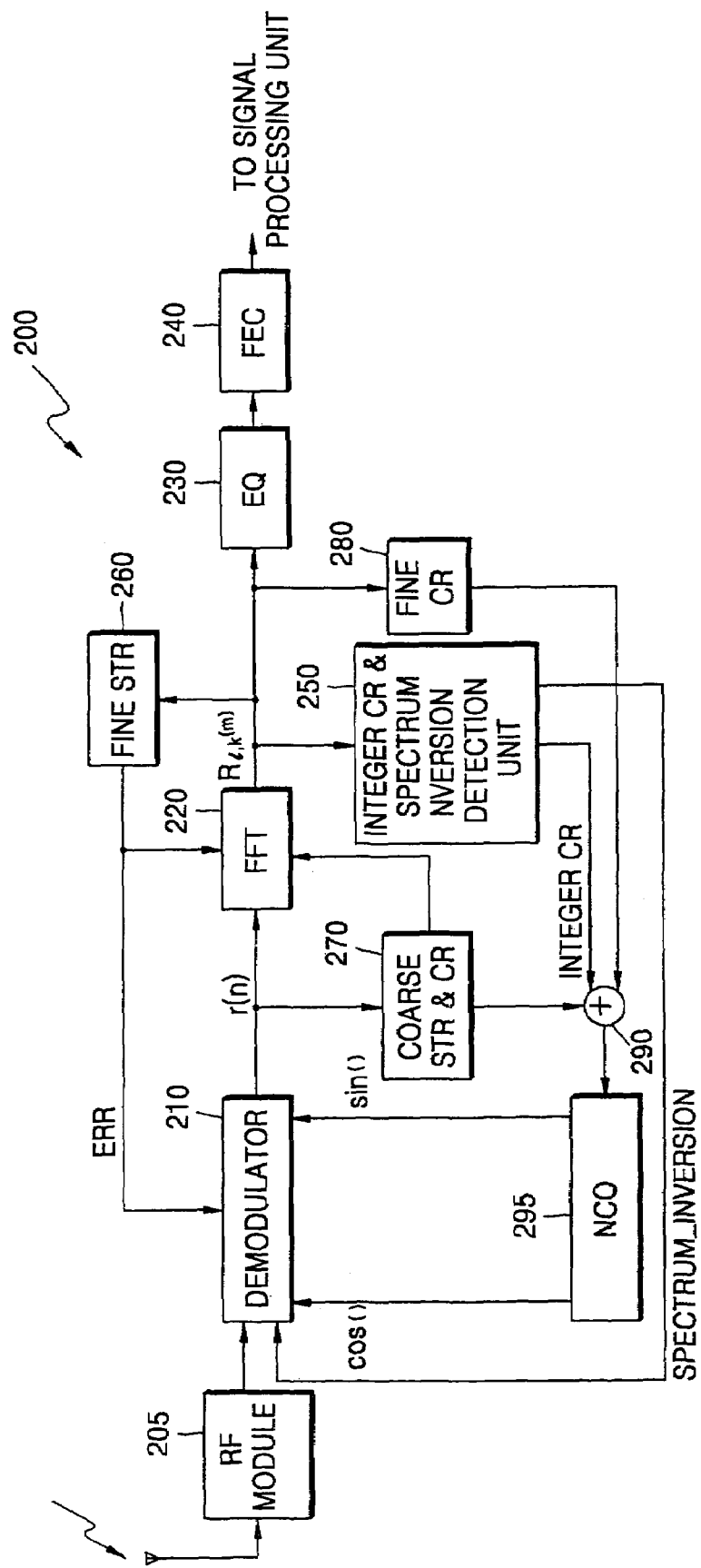
FIG. 2 is a block diagram of a DVB-T receiver according to some embodiments of the present invention.
Figure 5:
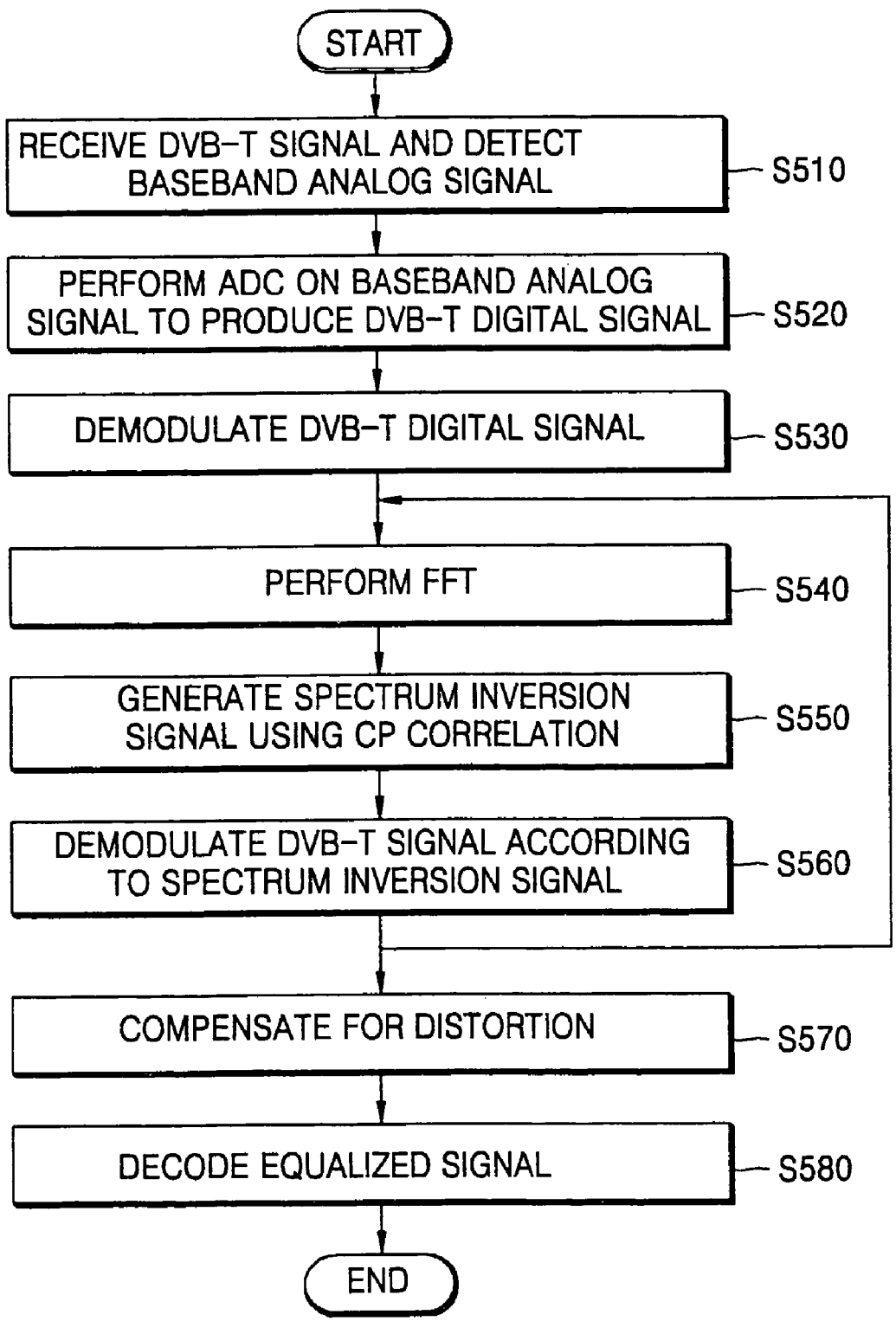
FIG. 5 is a flowchart illustrating operations of DVB-T receivers according to some embodiments of the present invention.

FIG. 2 is a block diagram of a DVB-T receiver 200 according to some embodiments of the present invention. Referring to FIG. 2, the DVB-T receiver 200 may include an RF module 205, a demodulator 210, an FFT unit 220, an equalizer 230, a decoder 240, an integer carrier recovery (CR) and spectrum inversion detection unit 250, a symbol timing recovery and carrier recovery (STR & CR) unit 270, a fine STR unit 260, a fine CR unit 280, a combiner 290, and a number-controlled oscillator 295. The operation of the DVB-T receiver 200 will now be described with reference to FIGS. 2 and 5.

The RF module 205 receives a DVB-T signal from an allocated channel and detects a baseband analog signal in operation S510. The RF module 205 converts the detected baseband analog signal into a DVB-T digital signal and generates the DVB-T digital signal in operation S520. The demodulator 210 demodulates the DVB-T digital signal according to a demodulation format, such as a quadrature amplitude modulation (QAM) format, a binary phase shift keying (BPSK) format, or a quadrature phase shift keying (QPSK) format, in operation S530. The demodulated signal r(n) is a baseband sampled complex signal. In particular, the demodulator 210 demodulates the received DVB-T digital signal according to a spectrum inversion signal (Spectrum_Inversion) with spectrum inversion being automatically detected according to embodiments of the present invention. Methods of detecting the spectrum inversion signal Spectrum_Inversion and demodulating methods using the spectrum inversion signal detecting method will be described below with reference to FIGS. 3 and 4.

In operation S540, the FFT unit 220 performs FFT on the signal r(n) demodulated by the demodulator 210. FFT processing is well known to those of ordinary skill in the art, and FFT processed signal $R_{l,k}(m)$ is a frequency domain complex signal.

Figure 3:
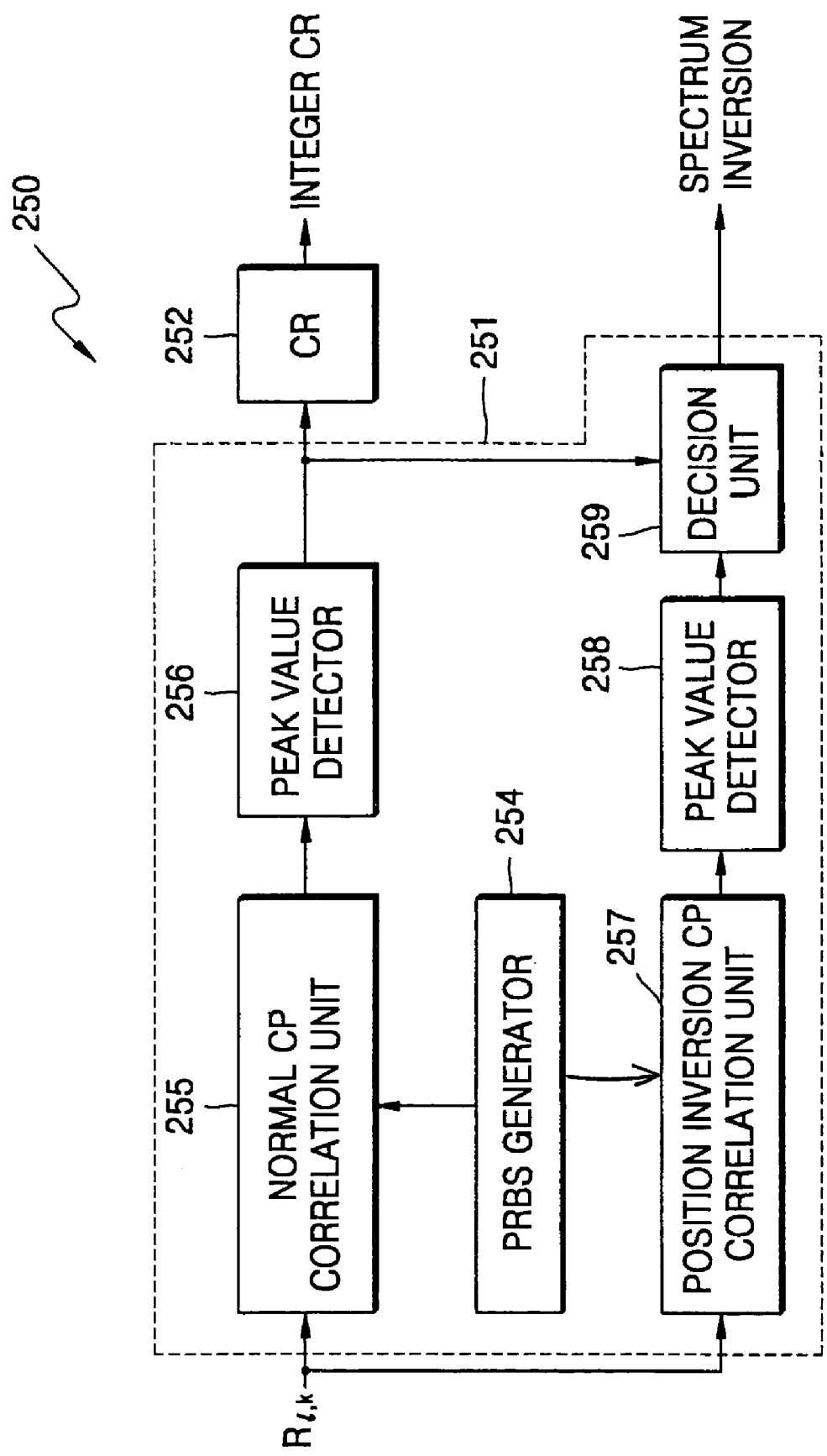
FIG. 3 is a block diagram of an integer carrier recovery and spectrum inversion detection unit of FIG. 2.

The integer CR and spectrum inversion detection unit 250 may include a spectrum inversion detection unit 251 and an integer CR unit 252 as shown in FIG. 3. The integer CR unit 252 may detect carrier frequency offset information Integer_CR having an integer value from the FFT processed signal $R_{l,k}(m)$. The spectrum inversion detection unit 251 may calculate correlation values by performing continual pilot correlation of the FFT processed signal $R_{l,k}(m)$ and may generate the spectrum inversion signal Spectrum_Inversion indicating whether the spectrum inversion has occurred according to the calculated correlation values in operation S550. A method of detecting the spectrum inversion signal Spectrum_Inversion using the continual pilot correlation will be described below with reference to FIG. 3 later.

The demodulator 210 demodulates the received DVB-T digital signal by selectively applying spectrum inversion or non-spectrum inversion to the DVB-T digital signal according to a logical state of the spectrum inversion signal Spectrum_Inversion in operation S560. That is, when the demodulator 210 demodulates the received DVB-T digital signal using a cosine oscillation signal cos( ) and a sine oscillation signal sin( ) generated by the number-controlled oscillator 295, the demodulator 210 selectively multiplies the sine oscillation signal sin( ) by ±1 according to the logical state of the spectrum inversion signal Spectrum_Inversion. For example, when the spectrum inversion signal Spectrum_Inversion is in a logic high state, the demodulator 210 uses a positive sine oscillation signal +sin( ), and when the spectrum inversion signal Spectrum_Inversion is in a logic low state, the demodulator 210 uses a negative sine oscillation signal −sin( ). Demodulating methods of the demodulator 210 will be described below with reference to FIG. 4.

The number-controlled oscillator 295 generates the cosine oscillation signal cos( ) and the sine oscillation signal sin( ) by oscillating at a predetermined frequency according to number information generated by the combiner 290, and the number-controlled oscillator 295 provides the oscillation signals as carrier signals to the demodulator 210. The combiner 290 combines information from the STR & CR unit 270, the integer CR unit 252, and the fine CR unit 280. The STR & CR unit 270 detects coarse symbol timing offset information and coarse carrier frequency offset information from the signal r(n) from the demodulator 210. As described above, the integer CR unit 252 included in the integer CR and spectrum inversion detection unit 250 detects the carrier frequency offset information Integer_CR having an integer value from the FFT processed signal $R_{l,k}(m)$. The fine CR unit 280 detects carrier frequency offset information which has a common fraction value, i.e., a real number smaller than zero.

The fine STR unit 260 detects fine symbol timing offset information ERR from the FFT processed signal $R_{l,k}(m)$. The FFT unit 220 performs FFT using the coarse symbol timing offset information detected by the STR & CR unit 270 and the fine symbol timing offset information ERR detected by the fine STR unit 260. That is, according to an FFT start position indicated on the basis of the symbol timing offset information calculated from the demodulated signal r(n) and the FFT processed signal $R_{l,k}(m)$, the FFT unit 220 reduces and/or removes a guard interval from the signal r(n) demodulated by the demodulator 210 and performs a predetermined sized FFT. Guard intervals and the FFT operations are well known to those of ordinary skill in the art.

The fine symbol timing offset information ERR detected by the fine STR unit 260 may also be used by the demodulator 210. That is, the demodulator 210 may compensate for sampling timing offset of the DVB-T digital signal received from the RF module 205 according to the fine symbol timing offset information ERR.

The equalizer 230 may compensate for distortion of the FFT processed signal $R_{l,k}(m)$ and may generate a distortion compensated signal as an equalized signal in operation S570. The decoder 240 may decode the equalized signal generated by the equalizer 230 and may generate the decoded signal in operation S580. The decoder 240 may be, for example, a Viterbi decoder and/or a Reed Solomon decoder performing forward error correction (FEC) and/or decoding. The decoded signal may be processed by a predetermined signal processing unit, and display and audio signals may be generated.

FIG. 3 is a block diagram of the integer CR and spectrum inversion detection unit 250 of FIG. 2. The integer CR and spectrum inversion detection unit 250 may include the spectrum inversion detection unit 251 and the integer CR unit 252. The spectrum inversion detection unit 251 may include a PRBS generator 254, a normal continual pilot correlation unit 255, a first peak value detector 256, a position inversion continual pilot correlation unit 257, a second peak value detector 258, and a decision unit 259.

The PRBS generator 254 may generate a PRBS signal, and the PRBS signal may be generated for a continual pilot correlation. The continual pilots may be subcarriers inserted in OFDM symbols and may satisfy Equation 1. Positions of the continual pilots and a modulating method may be defined by a conventional DBV-T standard. In Equation 1, c is a continual pilot, m is a frame index, k is a frequency index of subcarriers, l is a time index of symbols, and $w_k$ is a kth element of a PRBS signal.

$$Re\{c_{m,l,k}\} = \frac{4}{3} \times 2(\frac{1}{2} - w_k)$$

$$Im\{c_{m,l,k}\} = 0 \quad \text{[Equation 1]}$$

A DBV-T digital signal generated by the RF module 205 can be received in a spectrum inversion mode or a non-spectrum inversion mode. When the DBV-T digital signal is received in the non-spectrum inversion mode, a correlation between a signal r(n) generated by the demodulator 210 and a signal $R_k$ generated by the FFT unit 220 performing a discrete Fourier transform (DFT) satisfies Equation 2. When the DBV-T digital signal is received in the spectrum inversion mode, the correlation satisfies Equation 3. Here, r*(n) indicates a conjugate complex of r(n) and $(-k)_N = -k \mod N$ where N is the size of the DFT. That is, $-k \mod N$ ($-k$ module N) is a remainder generated by dividing $(-k)$ by N.

$$r(n) \xleftrightarrow{DFT} R_k \quad \text{[Equation 2]}$$

$$r^*(n) \xleftrightarrow{DFT} R^*_{(-k)_N} \quad \text{[Equation 3]}$$

As shown in Equation 3, when the DBV-T digital signal is received in the spectrum inversion mode, a subcarrier position of the signal $R_k$ generated by the FFT unit 220 may be inverted. Accordingly, a subcarrier position of a continual pilot calculated in Equation 1 may also be inverted. More particularly, whether the spectrum inversion detection unit 251 receives the DBV-T digital signal in the spectrum inversion mode or non-spectrum inversion mode may be automatically determined on the basis of Equations 1, 2 and 3. Accordingly, the demodulator 210 may demodulate the DBV-T digital signal by selectively applying spectrum inversion or non-spectrum inversion to the DBV-T digital signal according to the spectrum inversion signal Spectrum_Inversion generated by the spectrum inversion detector 251.

The normal continual pilot correlation unit 255 may generate first correlation values by performing continual pilot correlation for the FFT processed signal $R_{l,k}(m)$ using the PRBS signal. The position inversion continual pilot correlation unit 257 may receive the FFT processed signal $R_{l,k}(m)$, invert a position of the FFT processed signal $R_{l,k}(m)$, and generate second correlation values by performing continual pilot correlation for the position inverted signal using the PRBS signal.

In continual pilot correlation performed by the normal continual pilot correlation unit 255, the FFT processed signal $R_{l,k}(m)$ may be received in subcarrier units, a plurality of delayed subcarriers may be generated and multiplied by values of the PRBS signal corresponding to the delayed, subcarriers, and a value obtained by adding all the multiplied values may be set as a first correlation value. For example, the first correlation value can be given by 'CP(0)×PRBS(0)+CP(1)×PRBS(1)+CP(2)×PRBS(2)+ . . . +CP(M)×PRBS(M)'. Here, CP(0) . . . CP(M) indicate the plurality of delayed subcarriers for continual pilots and PRBS(0) . . . PRBS(M) are values of the PRBS signal corresponding to the delayed subcarriers for continual pilots. Likewise, in continual pilot correlation performed by the position inversion continual pilot correlation unit 257, the FFT processed signal $R_{l,k}(m)$ may be received in subcarrier units after its position is inverted, a plurality of position inverted subcarriers may be generated and multiplied by values of the PRBS signal corresponding to the position inverted subcarriers, and a value obtained by adding all the multiplied values may be set as a second correlation value. For example, the second correlation value can be given by 'CP(M)×PRBS(0)+CP(M−1)×PRBS(1)+CP(M−2)×PRBS(2)+ . . . +CP(0)×PRBS(M)'. These correlation value calculations will be understood by those of ordinary skill in the art.

The first peak value detector 256 may detect a maximum of the first correlation values of one symbol generated by the normal continual pilot correlation unit 255 during the continual pilot correlation and may generate the detected maximum value as a first peak value. When the DBV-T digital signal generated in the non-spectrum inversion mode is received, the first peak value may be detected at a position satisfying Equation 1. Also, the second peak value detector 258 may detect a maximum of the second correlation values of one symbol generated by the position inversion continual pilot correlation unit 257 during continual pilot correlation and may generate the detected maximum value as a second peak value. When the DBV-T digital signal of the spectrum inversion mode is received, the second peak value may be detected at a position satisfying Equation 1.

The decision unit 259 may compare the second peak value with the first peak value and may generate the spectrum inversion signal Spectrum_Inversion according to the comparison result. For example, if the first peak value is greater than the second peak value, the spectrum inversion signal Spectrum_Inversion may be generated having a logic low state. Otherwise, the spectrum inversion signal Spectrum_Inversion may be generated having a logic high state.

The decision unit 259 can thus set the spectrum inversion signal Spectrum_Inversion to indicate the spectrum inversion mode or the non-spectrum inversion mode. Accordingly, the demodulator 210 may demodulate the DBV-T digital signal according to the set state. When the spectrum inversion signal Spectrum_Inversion is set, the integer CR unit 252 may detect the carrier frequency offset information Integer_CR having an integer value using the first peak value and may provide the detected carrier frequency offset information Integer_CR to the combiner 290.

Figure 4:
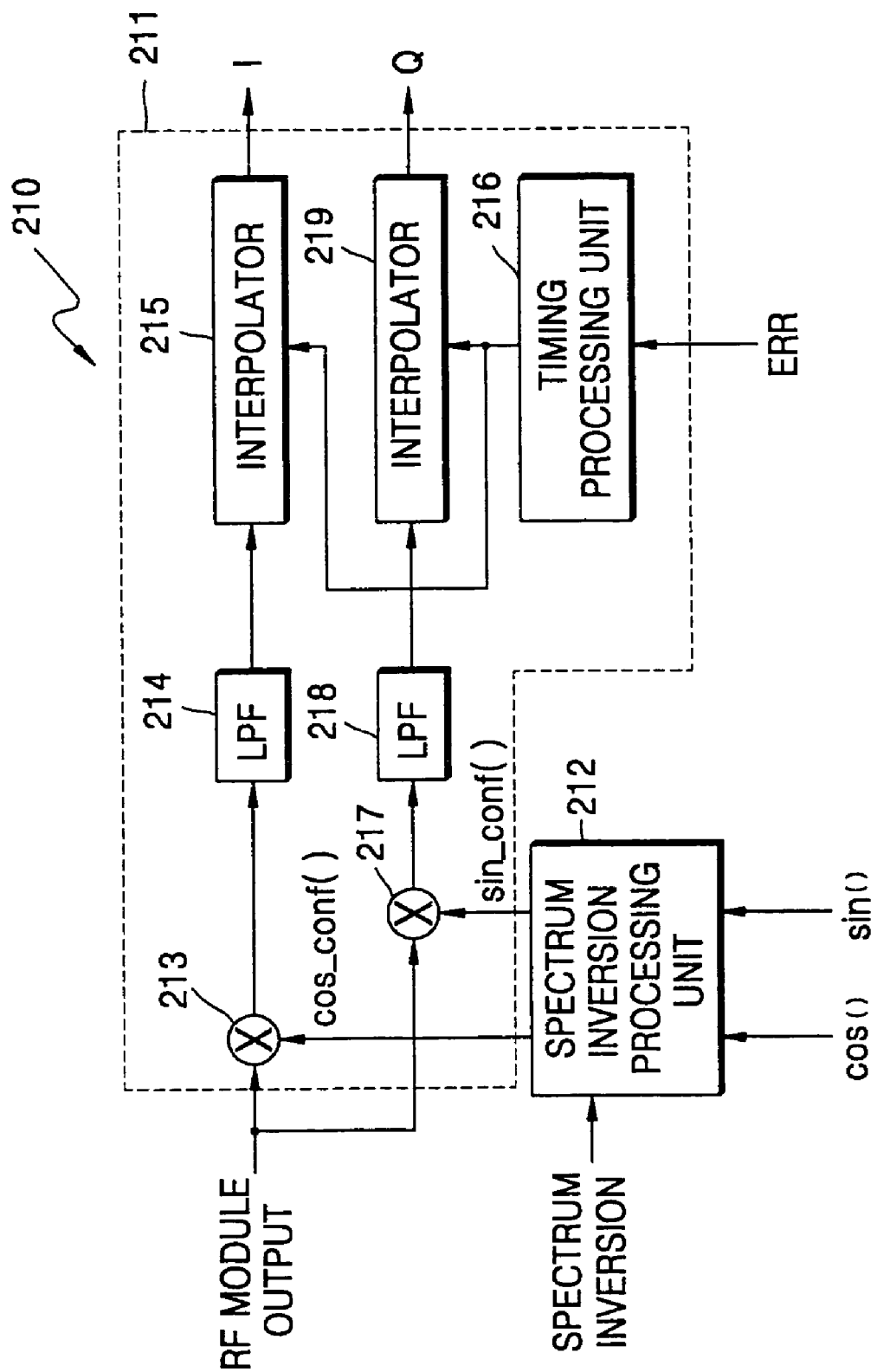
FIG. 4 is a block diagram of a demodulator of FIG. 2.

FIG. 4 is a block diagram of demodulator 210 of FIG. 2. Referring to FIG. 4, the demodulator 210 may include a sampling and filtering unit 211 and a spectrum inversion processing unit 212.

The spectrum inversion processing unit 212 may reconstruct the cosine oscillation signal cos( ) and the sine oscillation signal sin( ) generated by the number-controlled oscillator 295 to be suited to the spectrum inversion signal Spectrum_Inversion set by the decision unit 259 and may provide the reconstructed signals to the sampling and filtering unit 211. For example, when the spectrum inversion signal Spectrum_Inversion is in the logic high state, the spectrum inversion processing unit 212 may generate cos( ) and −sin( ) as the reconstructed cosine oscillation signal cos_conf( ) and the reconstructed sine oscillation signal sin_conf( ), respectively. When the spectrum inversion signal Spectrum_Inversion is in the logic low state, the spectrum inversion processing unit 212 may generate cos( ) and +sin( ) as the reconstructed cosine oscillation signal cos_conf( ) and the reconstructed sine oscillation signal sin_conf( ), respectively.

The sampling and filtering unit 211 may include a first multiplier 213, a first low pass filter (LPF) 214, a first interpolator 215, a timing processing unit 216, a second multiplier 217, a second LPF 218, and a second interpolator 219. The first multiplier 213 may multiply the DBV-T digital signal and the reconstructed cosine oscillation signal cos_conf( ) to perform a sampling operation and obtain an in-phase signal I from the DBV-T digital signal generated by the RF module 205 according to a relevant format (e.g., QAM, BPSK, or QPSK). The second multiplier 217 may multiply the DBV-T digital signal with the reconstructed sine oscillation signal sin_conf( ) to perform a sampling operation and obtain a quadrature-phase signal Q from the DBV-T digital signal according to a relevant format (e.g., QAM, BPSK, or QPSK). The first LPF 214 and the second LPF 218 may perform low pass filtering on signals from the first multiplier 213 and the second multiplier 217, respectively. The timing processing unit 216 may generate a timing signal offset-compensated according to the fine symbol timing offset information ERR generated by the fine STR unit 260. The first interpolator 215 and the second interpolator 219 interpolate signals processed by the first LPF 214 and the second LPF 218 according to the offset compensated timing signal and may generate the interpolated signals, respectively.

As described above, a DVB-T receiver 200 according to some embodiments of the present invention may perform a normal correlation and a position inversion correlation for continual pilots using a spectrum inversion detector 251 to automatically detect whether or not spectrum inversion has occurred. Since the DVB-T receiver may automatically detect spectrum inversion, a user is not required to set an inversion or non-inversion mode, and a convenience of design of the DVB-T receiver may be improved.

While the present invention has been particularly shown and described with reference to embodiments thereof, it will be understood by those skilled in the art that various changes in form and details may be made therein without departing from the spirit and scope of the invention as defined by the appended claims and their equivalents.

What is claimed is:

1. A terrestrial digital video broadcasting (DVB-T) receiver comprising:
a demodulator configured to demodulate a received DVB-T digital signal responsive to a spectrum inversion signal;
a fast Fourier transformation (FFT) unit configured to perform fast fourier transformation (FFT) on the demodulated signal; and
a spectrum inversion detector configured to calculate continual pilot correlation values for the FFT-processed signal and to generate the spectrum inversion signal to indicate whether spectrum inversion has occurred responsive to the calculated correlation values.

2. The receiver of claim 1, further comprising:
an equalizer configured to compensate for distortion of the FFT-processed signal and to provide the distortion-compensated signal as an equalized signal; and
a decoder configured to decode the equalized signal from the equalizer to provide a decoded signal.

3. The receiver of claim 1, wherein the demodulator is further configured to demodulate the received DVB-T digital signal using a cosine oscillation signal and a sine oscillation signal and to demodulate the received DVB-T digital signal by selectively applying the sine oscillation signal to the received DVB-T digital signal as a positive value or a negative value responsive to a logical state of the spectrum inversion signal.

4. The receiver of claim 1, wherein the spectrum inversion detector comprises:
a pseudo random binary sequence (PRBS) generator configured to generate a PRBS signal;
a normal correlation unit configured to generate first correlation values by performing continual pilot correlation for the FFT-processed signal using the PRBS signal;
a first peak value detector configured to detect a maximum of the first correlation values of one symbol and to generate the detected maximum value as a first peak value;
a position inversion correlation unit configured to receive a signal obtained by inverting a position of the FFT-processed signal and to generate second correlation values by performing a continual pilot correlation for the position inverted signal using the PRBS signal;
a second peak value detector configured to detect a maximum of the second correlation values of one symbol and to generate the detected maximum value as a second peak value; and
a decision unit configured to compare the second peak value with the first peak value and to generate the spectrum inversion signal as a function of the comparison.

5. The receiver of claim 1, wherein the continual pilots are subcarriers of OFDM symbols satisfying $\text{Re}\{c_{m,l,k}\}=\frac{4}{3}\times$ $2(\frac{1}{2}-w_k)$ and $\text{Im}\{c_{m,l,k}\}=0$, where c is a continual pilot, m is a frame index, k is a frequency index of subcarriers, l is a time index of symbols, and $w_k$ is a kth element of a PRBS signal.

6. The receiver of claim 1, wherein the FFT unit performs FFT on the demodulated signal using symbol timing offset information calculated from the demodulated signal and the FFT-processed signal.

7. The receiver of claim 1, wherein the demodulator is further configured to demodulate the received DVB-T digital signal using a cosine oscillation signal and a sine oscillation signal determined from the carrier frequency offset information calculated from the demodulated signal and the FFT-processed signal and using symbol timing offset information calculated from the FFT-processed signal.

8. A DVB-T receiving method comprising:
    demodulating a received DVB-T digital signal responsive to a spectrum inversion signal;
    performing fast Fourier transformation (FFT) on the demodulated signal;
    calculating continual pilot correlation values for the FFT-processed signal; and
    generating the spectrum inversion signal indicating whether spectrum inversion has occurred responsive to the calculated correlation values.

9. The method of claim 8, further comprising:
    compensating for distortion of the FFT-processed signal to provide the distortion-compensated signal as an equalized signal; and
    decoding the equalized signal.

10. The method of claim 8, wherein, demodulating includes using a cosine oscillation signal and a sine oscillation signal wherein the sine oscillation signal is selectively applied to the received DVB-T digital signal as a positive value or a negative value responsive to a logical state of the spectrum inversion signal.

11. The method of claim 8, wherein generating the spectrum inversion signal comprises:
    generating a PRBS signal;
    performing a continual pilot correlation for the FFT-processed signal using the PRBS signal to provide first correlation values;
    providing the maximum of the first correlation values of one symbol as a first peak value;
    inverting a position of the FFT-processed signal;
    performing a continual pilot correlation for the position inverted signal using the PRBS signal to provide second correlation values;
    providing the maximum of the second correlation values of one symbol as a second peak value;
    comparing the second peak value with the first peak value; and
    generating the spectrum inversion signal as a function of the comparison.

12. The method of claim 8, wherein the continual pilots are subcarriers of OFDM symbols satisfying $\text{RE}\{c_{m,l,k}\}=\frac{4}{3}\times 2(\frac{1}{2}-w_k)$ and $\text{Im}\{c_{m,l,k}\}=0$, where c is a continual pilot, m is a frame index, k is a frequency index of subcarriers, l is a time index of symbols, and $w_k$ is a kth element of a PRBS signal.

13. The method of claim 8, wherein FFT is performed using symbol timing offset information calculated from the demodulated signal and the FFT-processed signal.

14. The method of claim 8, wherein demodulating includes using a cosine oscillation signal and a sine oscillation signal determined from the carrier frequency offset information calculated from the demodulated signal and the FFT-processed signal and using symbol timing offset information calculated from the FFT-processed signal.

15. A method of receiving DVB-T signals, the method comprising:
    demodulating a received DVB-T digital signal responsive to a spectrum inversion signal to provide a demodulated signal;
    performing fast Fourier transformation (FFT) on the demodulated signal to provide an FFT signal;
    calculating continual pilot correlation values for the FFT signal; and
    generating the spectrum inversion signal responsive to the correlation values wherein the spectrum inversion signal has a first value when spectrum inversion is not detected and wherein the spectrum inversion signal has a second value when spectrum inversion is detected.

16. A method according to claim 15 further comprising:
    compensating for distortion of the FFT signal to provide an equalized signal; and
    decoding the equalized signal.

17. A method according to claim 15 wherein demodulating the received DVB-T digital signal includes demodulating the received DVB-T digital signal using a cosine oscillation signal and a sine oscillation signal.

18. A method according to claim 17 wherein the sine oscillation signal responsive to the second value of the spectrum inversion signal is inverted relative to the sine oscillation signal responsive to the first value of the spectrum inversion signal.

19. A method according to claim 15 wherein the first and second values of the spectrum inversion signal comprise respective first and second logic values.

20. A method according to claim 15 wherein generating the spectrum inversion signal includes:
    performing continual pilot correlation for the FFT signal to provide first correlation values;
    providing a maximum of the first correlation values of a symbol as a first peak value;
    inverting a position of the FFT signal to provide an inverted signal;
    performing continual pilot correlation for the inverted signal to provide second correlation values;
    providing a maximum of the second correlation values of the symbol as a second peak value;
    comparing the first and second peak values; and
    generating the spectrum inversion signal as a function of the comparison.

* * * * *